(12) United States Patent
Kim

(10) Patent No.: US 8,482,177 B2
(45) Date of Patent: Jul. 9, 2013

(54) TORQUE ROTOR AND METHOD FOR MANUFACTURING THE SAME

(75) Inventor: Chae-soo Kim, Gunpo-si (KR)

(73) Assignee: Mando Corporation, Gyeonggi-Do (KR)

( * ) Notice: Subject to any disclaimer, the term of this patent is extended or adjusted under 35 U.S.C. 154(b) by 542 days.

(21) Appl. No.: 12/748,130

(22) Filed: Mar. 26, 2010

(65) Prior Publication Data

US 2010/0244606 A1    Sep. 30, 2010

(30) Foreign Application Priority Data

Mar. 30, 2009   (KR) ........................ 10-2009-0026887

(51) Int. Cl.
*H02K 1/27*         (2006.01)
(52) U.S. Cl.
USPC ............ 310/156.13; 310/156.12; 310/156.14; 310/156.08; 310/156.21

(58) Field of Classification Search
USPC ............. 310/156.01–156.84, 156.13, 156.12, 310/156.08, 156.14, 156.21; 29/596–598
See application file for complete search history.

(56) References Cited

U.S. PATENT DOCUMENTS

| | | | | |
|---|---|---|---|---|
| 4,594,525 A | * | 6/1986 | Stokes | 310/156.13 |
| 4,877,986 A | * | 10/1989 | Shimizu | 310/153 |
| 6,657,347 B2 | * | 12/2003 | Pfetzer | 310/156.08 |
| 8,080,907 B2 | * | 12/2011 | Jeung | 310/51 |

* cited by examiner

*Primary Examiner* — Tran Nguyen
*Assistant Examiner* — Leda Pham
(74) *Attorney, Agent, or Firm* — McDermott Will & Emery LLP

(57) ABSTRACT

Disclosed is a torque rotor and method for manufacturing the torque rotor having an effect of preventing inflow of plastic between a yoke and a magnet during a conventional plastic injection molding process for forming an assembling structure after assembling between the yoke and the magnet, thereby preventing degradation of a roundness of the magnet or damage of the magnet due to the difference in the temperature expansion coefficients, and preventing idle rotation of the yoke and the magnet relative to each other.

10 Claims, 5 Drawing Sheets

TORQUE ROTOR AND METHOD FOR MANUFACTURING THE SAME

BACKGROUND OF THE INVENTION

1. Field of the Invention

The present invention relates to a torque rotor. More particularly, the present invention relates to a torque rotor and a method for manufacturing the torque rotor, which can prevent inflow of plastic between a yoke and a magnet during a conventional plastic injection molding process for forming an assembling structure after assembling between the yoke and the magnet, thereby preventing degradation of a roundness of the magnet or damage of the magnet due to the difference in the temperature expansion coefficients, and preventing idle rotation of the yoke and the magnet relative to each other.

2. Description of the Prior Art

A vehicle generally uses a power steering apparatus serving as a means for reducing steering power of a steering wheel (handle) and guaranteeing the stability of a steering state. In this respect, a conventional Hydraulic Power Steering system (HPS) using hydraulic pressure has been widely used for the HPS of the vehicle. However, in contrary to the conventional scheme of using the hydraulic pressure, an Electronic Power Steering System (EPS) that makes steering performance of a driver easy using rotational force of a motor and is environment-friendly has been widely installed in vehicles recently.

Such an EPS drives a motor by means of an electronic control unit according to a driving condition of a vehicle sensed in a vehicle speed sensor, steering angle sensor, steering torque sensor, or the like, so that it provides light and comfortable steering sense in low-speed driving, a heavy steering sense and satisfactory direction stability in high-speed driving, and restoration force for promptly restoring the steering wheel according to a rotation angle of the steering wheel. Therefore, the EPS enables the prompt steering in an emergency so that it provides the driver with an optimum steering condition.

Meanwhile, in the EPS, the motor is installed in an external side of a steering column that is located between the steering wheel and a gear box so as to downwardly transfer the rotational force of the steering wheel of the driver so that it rotates a steering shaft within the steering column, thereby complementing steering power of the driver according to the steering of the steering wheel.

FIG. 1 is a view schematically illustrating a conventional electronic power steering apparatus. As shown in FIG. 1, the electronic power steering apparatus 100 includes a steering system 130 extending from a steering wheel 102 to wheels 126 in both sides and an auxiliary power mechanism 140 for supplying steering auxiliary power to the steering system 130.

The steering system 130 includes a steering shaft 106, of which one side is connected to the steering wheel 102 to rotate together with the steering wheel 102 and the other side is connected to a pinion shaft 108 through a pair of universal joints 104. Further, the pinion shaft 108 is connected to a rack bar 112 through a rack-pinion mechanism part 110 and both ends of the rack bar 112 are connected to the wheels 126 of a vehicle through a tie road 112 and a knuckle arm 124.

The auxiliary power mechanism 140 includes a torque sensor 142 for sensing torque applied to the steering wheel 102 by the driver and outputting an electric signal proportional to the sensed torque, an electric control unit 144 for generating a control signal based on the electric signal transferred from the torque sensor 142, a motor 146 for generating auxiliary power based on the control signal transferred from the electric control unit 144, and a reducer 150 including a worm gear 152 and a worm wheel gear 156 for transferring the auxiliary power generated in the motor 146 to the steering shaft 106.

FIG. 2 is an exploded perspective view illustrating the conventional torque sensor.

As illustrated in FIG. 2, the conventional torque sensor 142 includes a torque rotor 220, a position rotor 230, a magnetic charge detection unit 240, the electric control unit, and a housing 255.

The torque sensor 142 measures the torque of an input shaft 180 and an output shaft 140 of the steering shaft and sends the measured torque to the electric control unit. Then, the electric control unit operates a driving motor and supplies the steering auxiliary power. Recently, a contactless torque sensor that measures a variation quantity of the magnetic field to measure the torque variation has been widely used.

The torque rotor 220 includes a rotor body 224 having a magnet 225 provided along an outer peripheral surface of the rotor body 224, an input shaft insertion hole 221 formed in a center of the rotor body 224, a plurality of compression parts 222 protruding along a boundary of the input shaft insertion hole 221, and a compression ring 223 fitted in the compression part 222.

The rotor body 224 is generally manufactured by injection-molding a plastic into a yoke (not shown) having a ring shape, and includes the magnet 225 on the outer peripheral surface thereof, in which the magnet 225 has N poles and S poles that alternately repeat along a boundary of the peripheral surface of the rotor body 224.

Here, the N poles and the S poles are alternately repeated 6 times, 8 times, or the like.

The position rotor 230 includes a torque rotor insertion part 239 in which the torque rotor 220 is seated and an output shaft fitting part 237 to which one end of the output shaft 140 is fitted in a center thereof. An upper magnetic body 236 connected to an upper stator 231 and a lower magnetic body 235 connected to a lower stator 232 are alternately located along a circumference of the torque rotor insertion part 239.

Here, the upper stator 231 and the upper magnetic body 236 connected with the upper stator 231 is a steel plate magnetized as an N pole and the lower stator 232 and the lower magnetic body 235 connected with the lower stator 232 is a steel plate magnetized as an S pole. Herein, a location of the N pole and S pole can be switched.

The magnetic charge detection unit 240 is fitted in one side of an outer peripheral surface of the position rotor 230 and includes a concentrator 242 provided vertically between the upper stator 231 and lower stator 232 of the position rotor 230. The magnetic charge detection unit 240 is rotatable relative to the position rotor 230.

The electric control unit receives the variation quantity of magnetic flux detected in the magnetic charge detection unit and controls a driving motor based on the received variation quantity of magnetic flux to complement the steering power of the driver.

The housing 255 is divided into an upper housing 210 and a lower housing 250 which encloses the position rotor 230 and the magnetic charge detection unit 240.

A torsion bar 205 is pressed and fitted in the input shaft 180 and output shaft 140 and then is fixed by a pin. If the driver rotates the steering wheel, the input shaft 180 connected with the steering wheel rotates and the output shaft 140 connected with the input shaft 180 through the torsion bar 205 rotates in conjunction with the input shaft 180.

At this time, if torsion is generated between the input shaft 180 and output shaft 140, a difference of a rotation angle is generated between the position rotor 230 that is pressed and fitted in the output shaft 140 to be fixed and the input shaft 180.

As described above, if the difference of the rotation angle is generated, the magnetic field formed between the upper magnetic body 236 and lower magnetic body 235 that are alternately repeated along the circumference of the position rotor 230 and the magnet 225 varies. Therefore, torque can be measured by a quantity of magnetic flux collected in the concentrator 242 of the torque sensor that passes two hole IC chips 243 and 245 installed on a substrate 241.

However, in the conventional torque rotor, a plastic injection molding process for preparing a structure for assembling the input shaft after the assembling of the yoke and the magnet is required. At this time, the plastic is flowed in the yoke and the magnet so that a roundness of the magnet is deteriorated, thereby incurring a problem of generation of magnetic field declination between the magnet and position rotor.

Further, the assembling of the yoke and the magnet is not stable so that the yoke and the magnet are idling relative to each other by shock or a difference of a coefficient of temperature expansion, thereby incurring a serious problem of generation of an error of a torque measurement value or the magnet breakage.

SUMMARY OF THE INVENTION

Accordingly, the present invention has been made to solve the above-mentioned problems occurring in the prior art, and the present invention provides a torque rotor and a method for manufacturing the torque rotor, which can prevent inflow of plastic between a yoke and a magnet during a conventional plastic injection molding process for forming an assembling structure after assembling between the yoke and the magnet, thereby preventing degradation of a roundness of the magnet or damage of the magnet due to the difference in the temperature expansion coefficients, and preventing idle rotation of the yoke and the magnet relative to each other.

In accordance with an aspect of the present invention, there is provided a torque rotor, including: a magnet with alternately repeated N poles and S poles for generating magnetic force, a yoke inserted into an inner peripheral surface of the magnet; and a tube inserted into an inner peripheral surface of the yoke, in which the magnet and yoke comprise a fixing part for preventing the magnet and yoke from idling rotating during rotation.

In accordance with another aspect of the present invention, there is provided a method for manufacturing a torque rotor, the method including the steps of: coating an adhesive an inner peripheral surface of a magnet and an outer peripheral surface of a yoke; assembling the magnet with the yoke, in which a protrusion or a groove of the magnet is inserted into a corresponding groove or protrusion of the yoke, respectively, and an end of the magnet is disposed on a stopper flange formed on an end of the yoke; and assembling the yoke with a tube, in which the tube is inserted into an inner surface of the yoke and an end of the yoke is disposed on a coupling flange formed on an end of the tube.

Accordingly, the torque rotor and the method for manufacturing the torque rotor of the present invention has an effect of preventing inflow of plastic between a yoke and a magnet during a conventional plastic injection molding process for forming an assembling structure after assembling between the yoke and the magnet, thereby preventing degradation of a roundness of the magnet or damage of the magnet due to the difference in the temperature expansion coefficients, and preventing idle rotation of the yoke and the magnet relative to each other.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
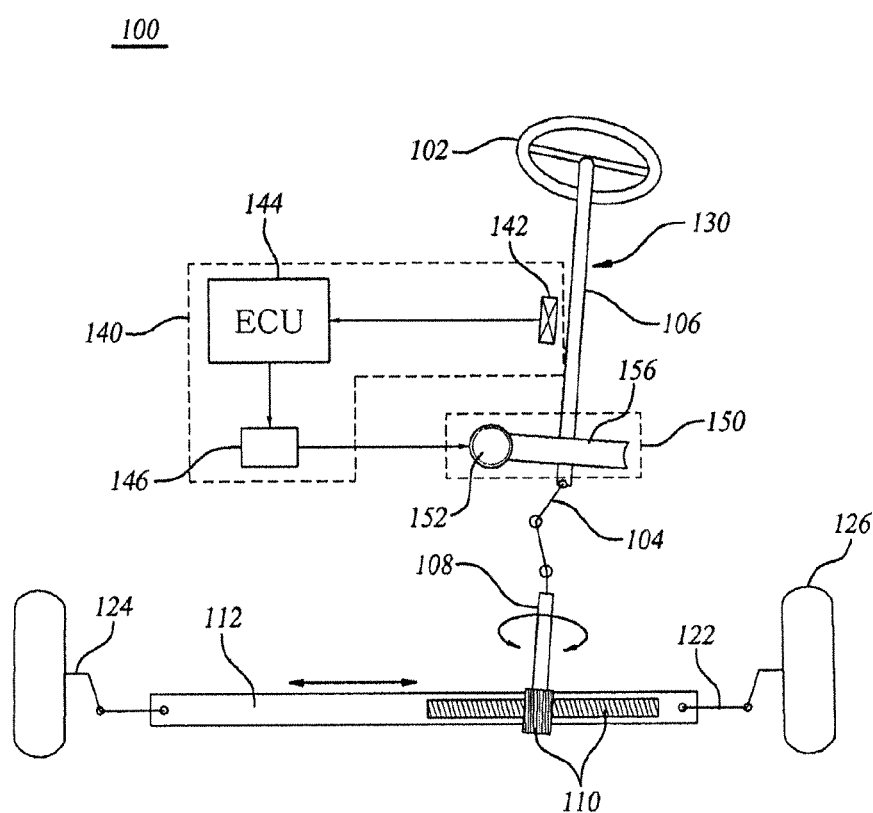
FIG. 1 is a view schematically illustrating a conventional electronic power steering apparatus.
Figure 2:
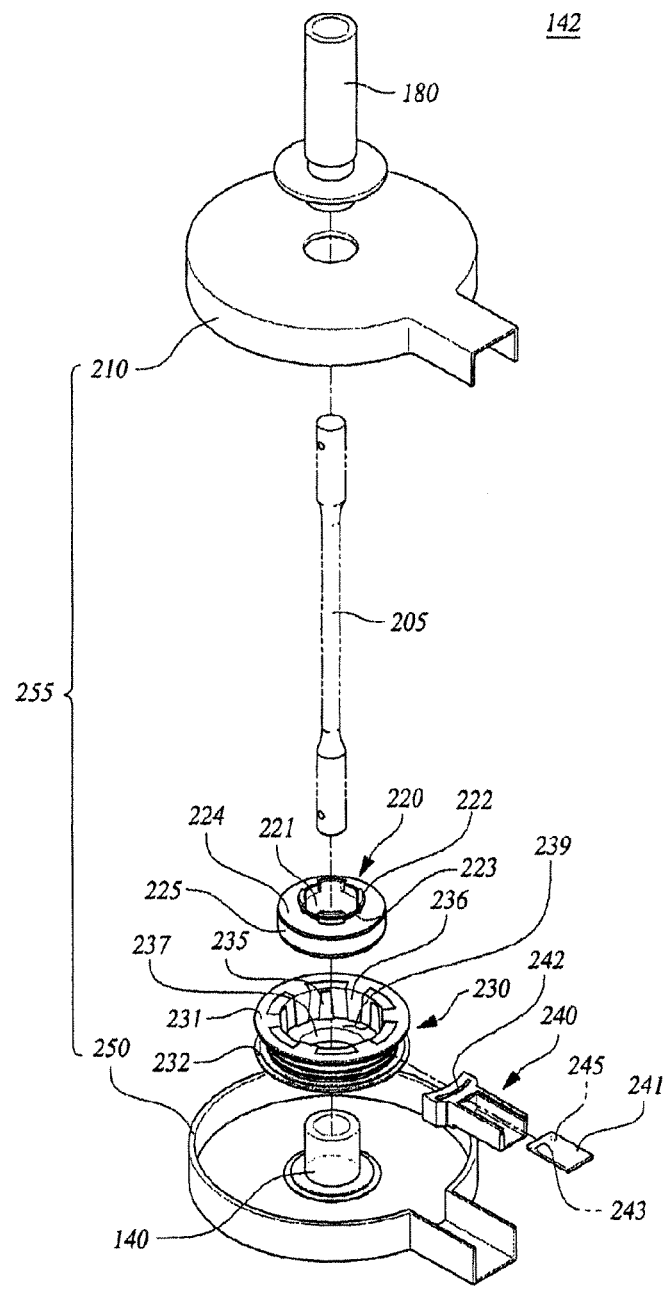
FIG. 2 is an exploded perspective view illustrating a conventional torque sensor.

Hereinafter, preferred embodiments of the present invention will be described with reference to the accompanying drawings. In the following description, the same elements will be designated by the same reference numerals although they are shown in different drawings. In the following description, detailed explanation of known related functions and constitutions may be omitted to avoid unnecessarily obscuring the subject manner of the present invention.

Further, a term of a first, a second, A, B, (a), (b), and the like may be used for describing a constructional element of the present invention. Such a term is only for discriminating the corresponding constructional element from another constructional element, but does not limit a nature, a sequence, or an order of the corresponding constructional element. If it is described that a constructional element is "linked", "assembled", or "connected" with another constructional element, the constructional element may be directly linked or connected to another constructional element, but it will be additionally appreciated that another constructional element can be further "linked", "assembled", or "connected" between each of the constructional elements.

Figure 3:
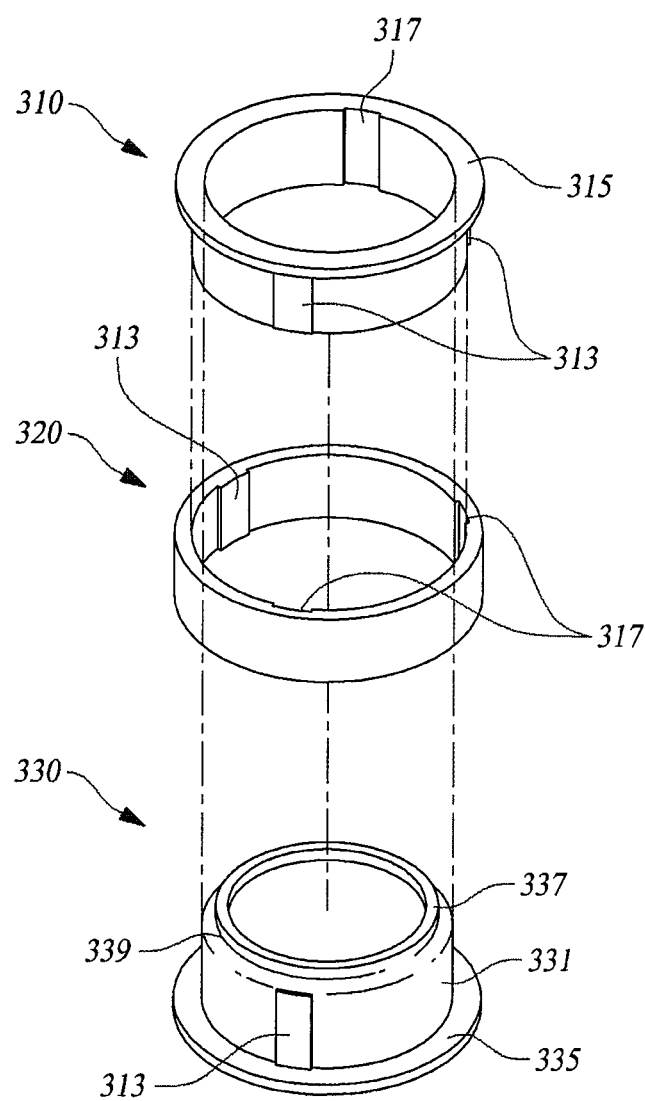
FIG. 3 is an exploded perspective view illustrating a torque rotor according to an exemplary embodiment of the present invention.
Figure 4:
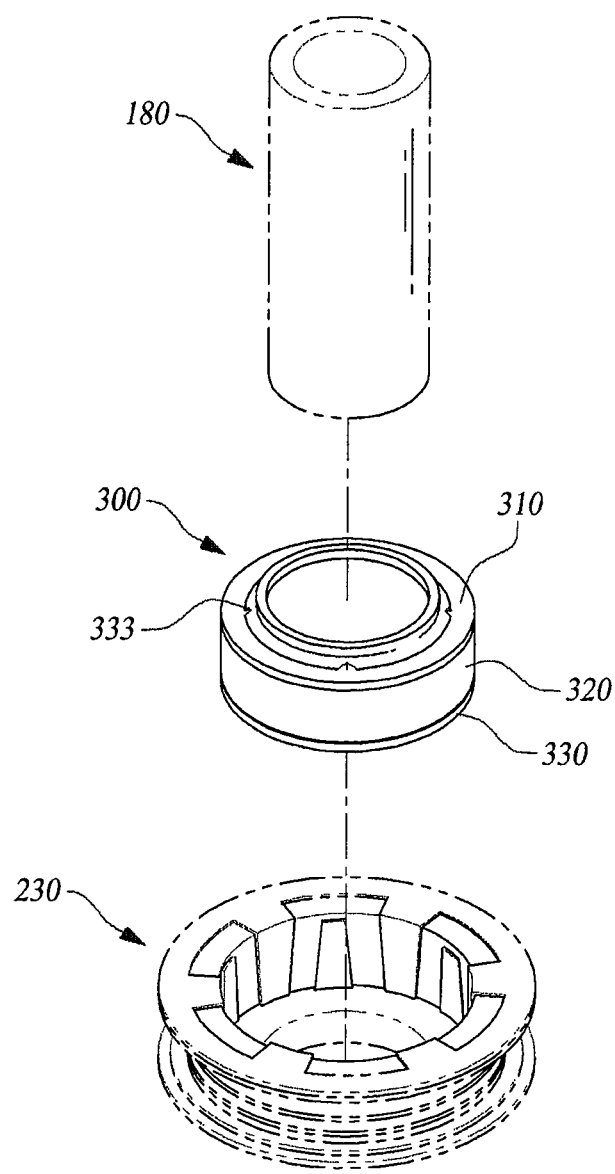
FIG. 4 is a perspective view illustrating an assembling state of a torque rotor according to an exemplary embodiment of the present invention.
Figure 5:
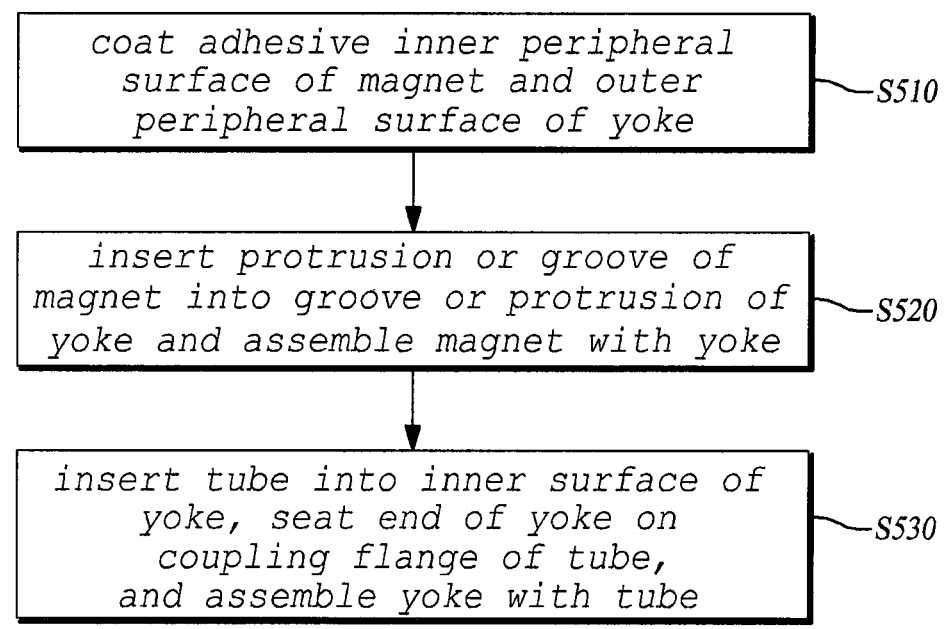
FIG. 5 is a flowchart illustrating a method for manufacturing the torque rotor according to the present invention.

FIG. 3 is an exploded perspective view illustrating a torque rotor according to an exemplary embodiment of the present invention, FIG. 4 is a perspective view illustrating an assembling state of a torque rotor according to an exemplary embodiment of the present invention, and FIG. 5 is a flowchart illustrating a method for manufacturing the torque rotor according to the present invention.

Referring to FIGS. 3 to 5, a torque rotor 300 according to an exemplary embodiment of the present invention includes a magnet 320 for generating magnetic force in which the N poles and the S poles are alternately repeated, a yoke 310 inserted into an inner peripheral surface of the magnet 320, and a tube 330 inserted into an inner peripheral surface of the yoke 310. The magnet 320 and yoke 310 include a fixing part that prevents the magnet 320 and yoke 310 from idling rotating during rotation.

The torque rotor 300 according to an exemplary embodiment of the present invention basically includes the magnet 320, the yoke 310, and the tube 330 which include an assembling structure including a protrusion 313, a groove 317, an adhesive agent, and a caulking 333 serving as the fixing part or a fixing means for preventing an error generated by separation and idle movement of the magnet 320, the yoke 310, and the tube 330 relative to each other.

The magnet 320 is shaped like a ring having a predetermined width and is easily broken due to a property of a material, so that the magnet 320 is assembled with and supported by the yoke 310 for protection. The magnet 320 has the N poles and the S poles that are alternately repeated in a circumferential boundary.

Here, magnetism of the magnet 320 is constructed in a manner that the N poles and the S poles are alternately repeated 6 times, 8 times, or the like, but is not limited thereto.

Meanwhile, the magnet 320 and yoke 310 includes the fixing part for preventing the magnet 320 and yoke 310 from idling rotating during the rotation. The fixing part includes at least one pair of a protrusion and a groove.

That is, the magnet 320 includes at least one protrusion 313 protruding inward from the inner peripheral surface of the magnet 320 or at least one groove 317 depressed outward from the inner peripheral surface of the magnet 320, in order to prevent the magnet 320 from separately rotating with respect to the yoke 310, which may cause an error in the torque measurement value necessary for operation of a steering wheel by a driver.

The yoke 310 assembled with the magnet 320 has a ring shape so as to prevent the breakage of the magnet 320 when the yoke 310 is in contact with the ring-shaped magnet 320. An outer peripheral surface of the yoke 310, which is inserted into the inner peripheral surface of the magnet 320, includes at least one groove 317 or protrusion (not shown) that correspond to and are assembled with the protrusion 313 and the groove 317 formed in the inner peripheral surface of the magnet 320, respectively.

That is, if the magnet 320 includes the protrusion 313, the yoke 310 has the groove 317 corresponding to and assembled with the protrusion 313 of the magnet 320, and if the magnet 320 has the groove 317, the yoke 310 has the protrusion (not shown) corresponding to and assembled with the groove 317 of the magnet 320.

If the protrusion 313 or groove 317 formed in the magnet 320 and yoke 310 can prevent the magnet 320 and yoke 310 from separately rotating relative to each other when the magnet 320 is assembled with the yoke 310, the magnet 320 and yoke 310 can include at least one protrusion 313 and groove 317, respectively. However, in some cases, the magnet 320 can include both the protrusion 313 and groove 317, and the yoke 310 includes the groove 317 and protrusion 313 that correspond to the protrusion 313 and groove 317 of the magnet 320, respectively.

Further, the yoke 310 includes a stopper flange 315 extending outward from the external peripheral surface at one side end of the yoke 310, so as to seat one side end of the magnet 320 on the stopper flange 315 and prevent the magnet 320 from becoming eccentric with respect to the center axis.

A tube 330 assembled with an inner side of the yoke 310 includes a large diameter portion 331 and a small diameter portion 337 having a predetermined diameter, and an inclined portion 339 formed by connecting the large diameter portion 331 and small diameter portion 337. The large diameter portion 331 is in contact with the inner peripheral surface of the yoke 310 and the small diameter portion 337 is assembled with the input shaft 180 that is connected with the steering shaft.

Further, an end of the large diameter portion 331 includes a coupling flange 335 on which the other side end of the magnet 320 seated on the stopper flange 315 of the yoke 310 is disposed so that it is possible to prevent the magnet 320 from leaving the axis direction. Further, the yoke 310 is bonded with the tube 330 through coating an adhesive on a coupling area of the yoke 310 and tube 330, so that it is possible to prevent an error of the torque measurement value that is generated by the idle movement of the yoke 310 and tube 330 relative to each other.

Further, the yoke 310 and tube 330 include the fixing part for preventing the yoke 310 and tube 330 from idling rotating caused by the omission of a bonding process or the degradation of the bonding property of the adhesive due to a temperature or environment change. The fixing part includes at least one pair of a protrusion and a groove.

That is, the yoke 310 includes at least one protrusion (not shown) inwardly protruding from the inner peripheral surface of the yoke 310 or at least one groove 317 outwardly depressed from the inner peripheral surface of the yoke 310. The tube 330 includes at least one groove (not shown) or protrusion 313 that correspond to and are assembled with the protrusion (not shown) or groove 317 formed on the yoke 310, respectively. Therefore, the protrusion 313 is inserted into and assembled with the groove 317.

In addition, a contact area between the stopper flange 315 of the yoke 310 and an external side of the large diameter portion 331 of the tube 330 is caulked 333 in a state that the yoke 310 is assembled with the tube 330, so that it is possible to assemble the yoke 310 and the tube 330 more solidly.

Therefore, through the calking 333, it is possible to achieve a double complementary structure which can prevent the magnet 320 and yoke 310 and the yoke 310 and tube 330 from idling rotating and the magnet 320, yoke 310, and tube 330 from becoming eccentric with respect to the center axis when the torque rotor 300 rotates while being located in a center of the position rotor 230.

In the meantime, according to a method for manufacturing the torque rotor 300 of the present invention, as shown in FIG. 5, first, an adhesive is coated on the inner peripheral surface of the magnet 320 and the outer peripheral surface of the yoke 310 in step S510. The protrusion 313 of the magnet 320 or groove 317 is inserted into the corresponding groove (not shown) or protrusion 313 of the yoke 310, respectively, and the end of the magnet 320 is seated on the stopper flange 315 formed on the end of the yoke 310, so that the magnet 320 is assembled with the yoke 310 in step S520. Next, the tube 330 is inserted in the inner side of the yoke 310 and the end of the yoke 310 is seated on the coupling flange 335 formed on the end of the tube 330 so that the yoke 310 is assembled with the tube 330 in step S530.

First, the adhesive is coated on the inner peripheral surface of the magnet 320 and the outer peripheral surface of the yoke 310 so as to prevent the magnet 320 and yoke 310 from idling rotating when they are assembled with each other. The protrusion 313 or groove 317 of the magnet 320 is inserted into the corresponding groove (not shown) or protrusion 313 of the yoke 310 so that the end of the magnet 320 is seated on the stopper flange 315 of the yoke 310.

If the magnet 320 is assembled with the yoke 310 as described above, the end of the yoke 310 is seated on the coupling flange 335 formed on the end of the tube 330 to be assembled.

Here, in the step of assembling the yoke 310 with the tube 330, the yoke 310 is bonded to the tube 330 through coating an adhesive on the inner peripheral surface of the yoke 310 and the outer peripheral surface of the tube 330. In a state where the adhesive is coated on them, the protrusion 313 or groove 317 of the yoke 310 is inserted into the corresponding groove 317 or protrusion 313 of the tube 330, respectively, and the end of the yoke 310 is seated on the coupling flange 335 formed on the end of the tube 330 so that the yoke 310 is assembled with the tube 330.

Further, after the yoke 310 is assembled with the tube 330, a step in which the space between the stopper flange 315 of the yoke 310 and the external side of the large diameter portion 331 of the tube 330 is caulked 333 for assembling can be additionally included.

Therefore, through the step of the caulking 333, it is possible to form a double complementary structure which can prevent the magnet 320 and yoke 310 and the yoke 310 and tube 330 from idling rotating and the magnet 320, yoke 310, and tube 330 from becoming eccentric with respect to the center axis when the torque rotor 300 rotates while being located in the center of the position rotor 230 to rotate.

Accordingly, the present invention described above has an effect of preventing degradation of a roundness of the magnet caused by inflow of plastic between a yoke and a magnet through a conventional plastic injection molding for forming an assembling structure after assembling the yoke and the magnet or damage of the magnet by a difference of a coefficient of temperature expansion, and the yoke and the magnet from idling rotating relative to each other.

In the above description, even though it is described as every constructional element in the embodiment of the present invention is operated through assembling with each other, the present invention is not necessarily limited to the embodiment. That is, at least one constructional element can be selectively assembled for operation within a range of the object of the present invention.

Further, the term of 'include', 'construct', or 'have' used in the above description has a meaning of including the corresponding constructional element as long as there is no specific contrary description. Therefore, it should be interpreted as further include another constructional element, not to exclude another constructional element. Every term including a technical or scientific term has an identical meaning that is generally understood by those skilled in the art if it is not differently defined. The general terms, such as a term defined in the dictionary, should be interpreted as the meaning according to a contextual meaning of a related technology, and should not be interpreted as an ideal or excessively formal meaning as long as they are not obviously defined in the present invention.

Although an exemplary embodiment of the present invention has been described for illustrative purposes, those skilled in the art will appreciate that various modifications, additions and substitutions are possible, without departing from the scope and spirit of the invention as disclosed in the accompanying claims. While the present invention has been shown and described with reference to certain exemplary embodiments thereof, it will be understood by those skilled in the art that various changes in form and details may be made therein without departing from the spirit and scope of the invention as defined by the appended claims. Therefore, an exemplary embodiment of the present invention has not been described for limiting purposes so that the scope and spirit of the invention may not limited by the exemplary embodiment thereof. Accordingly, the scope of the invention is not to be limited by the above embodiments but by the claims and the equivalents thereof.

The invention claimed is:

1. A torque rotor, comprising:
    a magnet with alternately repeated N poles and S poles for generating magnetic force;
    a yoke disposed on an inner peripheral surface of the magnet; and
    a tube disposed on an inner peripheral surface of the yoke, wherein the magnet and yoke comprise a fixing part for preventing the magnet and yoke from idling rotating during rotation,
    the yoke comprises a stopper flange disposed on one side end of the yoke, such that one side end of the magnet is disposed on the stopper flange to prevent the yoke and the magnet from becoming eccentric with respect to a center axis, and
    a caulking is disposed in a contact area between the stopper flange of the yoke and the tube to assemble the yoke and the tube.

2. The torque rotor as claimed in claim 1, wherein the fixing part of the magnet and yoke comprises:
    at least one pair of a protrusion and a groove formed on the inner peripheral surface of the magnet and on an outer peripheral surface of the yoke so that the yoke is inserted into and assembled with the magnet in a center shaft direction and the magnet and the yoke are supported in a circumference direction.

3. The torque rotor as claimed in claim 1, wherein the tube comprises:
    a large diameter portion disposed on the inner peripheral surface of the yoke;
    a small diameter portion on which an input shaft is disposed; and
    an inclined portion connecting the large diameter portion with the small diameter portion and having a smaller diameter than the large diameter portion, wherein the large diameter portion comprises: a coupling flange on which another side end of the magnet is disposed, to prevent the magnet from becoming eccentric with respect to the center axis, the coupling flange being disposed at an end of the large diameter portion.

4. The torque rotor as claimed in claim 1, wherein the yoke and the tube comprise:
    a fixing part for preventing the yoke and the tube from idling rotating during rotation.

5. The torque rotor as claimed in claim 4, wherein the fixing part of the yoke and the tube comprises:
    at least one pair of a protrusion part and a depression part formed on the inner peripheral surface of the yoke and on an outer peripheral surface of the tube so that the yoke is inserted into and assembled with the tube in a center shaft direction to support the yoke and the tube in a circumference direction.

6. The torque rotor as claimed in claim 1, wherein the caulking is disposed in a particular contact area between the stopper flange of the yoke and a large diameter portion of the tube to assemble the yoke and the tube.

7. A method for manufacturing a torque rotor, the method comprising the steps of:
    coating an adhesive on an inner peripheral surface of a magnet and on an outer peripheral surface of a yoke;
    assembling the magnet with the yoke by inserting a protrusion or a groove of the magnet into a corresponding groove or protrusion of the yoke, respectively and by disposing a first end of the magnet on a stopper flange disposed on an end of the yoke;
    assembling the yoke with a tube having a first end and a second end by inserting the tube into an inner surface of the yoke and by disposing a second end of the yoke on a coupling flange disposed on the second end of the tube; and
    caulking a space between the stopper flange of the yoke and an outer side of the tube after assembling of the yoke with tube.

8. The method as claimed in claim 7, wherein the step of assembling the yoke with the tube comprises:

bonding the yoke to the tube by coating an adhesive on an inner peripheral surface of the yoke and on an outer peripheral surface of the tube.

9. The method as claimed in claim 7, wherein the step of assembling the yoke with the tube comprises:

inserting a further protrusion or a further groove of the yoke to a corresponding groove or protrusion of the tube; and disposing the second end of the yoke on the coupling flange disposed on the second end of the tube.

10. The method as claimed in claim 7, wherein the step of caulking the space comprises:

caulking a particular space between the stopper flange of the yoke and an outer side of a large diameter portion of the tube.

\* \* \* \* \*